United States Patent
Shafin et al.

(10) Patent No.: US 12,425,172 B2
(45) Date of Patent: Sep. 23, 2025

(54) CQI ENHANCEMENT FOR MULTI-LINK OPERATION

(71) Applicant: Samsung Electronics Co., Ltd., Suwon-si (KR)

(72) Inventors: Rubayet Shafin, Allen, TX (US); Ahmed Atef Ibrahim Ibrahim, Plano, TX (US); Peshal Nayak, Plano, TX (US); Boon Loong Ng, Plano, TX (US); Vishnu Vardhan Ratnam, Plano, TX (US); Junsu Choi, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 17/932,263

(22) Filed: Sep. 14, 2022

(65) Prior Publication Data

US 2023/0088404 A1 Mar. 23, 2023

Related U.S. Application Data

(60) Provisional application No. 63/275,314, filed on Nov. 3, 2021, provisional application No. 63/253,669, filed
(Continued)

(51) Int. Cl.
*H04W 4/00* (2018.01)
*H04L 5/00* (2006.01)
*H04W 24/08* (2009.01)

(52) U.S. Cl.
CPC ........... *H04L 5/0057* (2013.01); *H04W 24/08* (2013.01)

(58) Field of Classification Search
CPC ... H04L 5/0057; H04L 5/0062; H04L 5/0048; H04W 24/08
See application file for complete search history.

(56) References Cited

U.S. PATENT DOCUMENTS 12,120,763 B2 * 10/2024 Jang ................. H04W 76/15
2008/0039098 A1 * 2/2008 Papasakellariou .. H04W 72/542
455/442
(Continued)

FOREIGN PATENT DOCUMENTS

EP 3849099 A1 7/2021
WO 2021159433 A1 8/2021

OTHER PUBLICATIONS

IEEE P802.11be—D2.0 "Part 11: Wireless LAN Medium Access Control (MAC) and Physical Layer (PHY) Specifications-Amendment 8: Enhancements for extremely high throughput (EHT)" May 2022, 873 pages.
(Continued)

*Primary Examiner* — Stephen M D Agosta

(57) ABSTRACT

Methods and apparatuses for facilitating enhanced channel quality measurements on links of a multi-link device (MLD) in a wireless local area network. A non-access point (AP) MLD comprises stations (STAs), each comprising a transceiver configured to form a link with a corresponding AP affiliated with an AP MLD and receive, over the link, a channel sounding signal. The non-AP MLD further comprises a processor configured to determine, based on the channel sounding signal received at a first time over a first one of the links, an initial channel quality indicator (CQI) value for the first link, and determine, based on interference caused on the first link by a second one of the links at a second time, a CQI offset value for the first link relative to the initial CQI value. The transceivers are configured to transmit, to the AP MLD, the initial CQI value and the CQI offset value.

18 Claims, 13 Drawing Sheets

Related U.S. Application Data on Oct. 8, 2021, provisional application No. 63/247,100, filed on Sep. 22, 2021.

(56) References Cited

U.S. PATENT DOCUMENTS

| | | | | |
|---|---|---|---|---|
| 2008/0132281 A1* | 6/2008 | Kim | ............... | H04B 7/0632 455/562.1 |
| 2010/0067396 A1* | 3/2010 | Cui | ............... | H04W 28/0236 370/252 |
| 2010/0296591 A1* | 11/2010 | Xu | ............... | H04B 7/0413 375/259 |
| 2011/0200131 A1* | 8/2011 | Gao | ............... | H04B 7/0639 375/267 |
| 2012/0008522 A1* | 1/2012 | Ng | ............... | H04L 5/0035 370/252 |
| 2012/0195226 A1* | 8/2012 | Liu | ............... | H04W 28/0236 370/252 |
| 2014/0192732 A1* | 7/2014 | Chen | ............... | H04L 1/003 370/328 |
| 2014/0254517 A1* | 9/2014 | Nam | ............... | H04B 7/0456 370/329 |
| 2015/0333845 A1* | 11/2015 | Zhang | ............... | H04B 7/0413 370/252 |
| 2016/0143043 A1* | 5/2016 | Chendamarai Kannan | ............... | H04L 1/1854 370/329 |
| 2016/0156402 A1* | 6/2016 | Hoshino | ............... | H04W 76/27 375/267 |
| 2017/0041118 A1* | 2/2017 | Liu | ............... | H04L 1/0009 |
| 2018/0098235 A1* | 4/2018 | Bagheri | ............... | H04W 72/044 |
| 2018/0138960 A1* | 5/2018 | Ahn | ............... | H04L 1/0048 |
| 2018/0278364 A1* | 9/2018 | Sandberg | ............... | H04L 1/0026 |
| 2019/0150016 A1* | 5/2019 | Kittichokechai | ............... | H04L 1/0001 370/252 |
| 2019/0190629 A1* | 6/2019 | Lin | ............... | H04W 24/10 |
| 2019/0208510 A1* | 7/2019 | Park | ............... | H04L 1/0033 |
| 2020/0045555 A1* | 2/2020 | Huang | ............... | H04W 72/20 |
| 2020/0169374 A1* | 5/2020 | Qi | ............... | H04B 7/024 |
| 2020/0195375 A1* | 6/2020 | Zhou | ............... | H04W 72/542 |
| 2020/0204277 A1* | 6/2020 | Zhou | ............... | H04W 24/08 |
| 2020/0274588 A1* | 8/2020 | Jiang | ............... | H04B 7/024 |
| 2020/0305006 A1* | 9/2020 | Chen | ............... | H04W 16/18 |
| 2022/0014305 A1* | 1/2022 | Hsu | ............... | H04B 7/0413 |
| 2022/0046621 A1* | 2/2022 | Kandala | ............... | H04B 7/0697 |
| 2022/0110147 A1* | 4/2022 | Li | ............... | H04W 72/23 |
| 2022/0174536 A1* | 6/2022 | Kwon | ............... | H04W 28/0268 |
| 2022/0287122 A1* | 9/2022 | Wang | ............... | H04W 8/22 |
| 2023/0088404 A1* | 3/2023 | Shafin | ............... | H04L 5/0057 370/329 |
| 2023/0156840 A1* | 5/2023 | Chitrakar | ............... | H04W 76/15 370/329 |
| 2023/0179380 A1* | 6/2023 | Huang | ............... | H04L 5/0057 370/252 |
| 2023/0328568 A1* | 10/2023 | Wu | ............... | H04W 24/10 370/252 |

OTHER PUBLICATIONS

IEEE P802.11—19/1935r30 "Compendium of straw polls and potential changes to the Specification Framework Document" Jun. 8, 2021, 368 pages.

Extended European Search Report issued Jul. 9, 2024 regarding Application No. 22873165.9, 7 pages.

IEEE P802.11be/D1.1; Draft Standard for Information technology—Telecommunications and information exchange between systems Local and metropolitan area networks—Specific requirements; "Part 11: Wireless LAN Medium Access Control (MAC) and Physical Layer (PHY) Specifications, Amendment 8: Enhancements for extremely high throughput (EHT)"; Jul. 2021; 685 pages.

International Search Report and Written Opinion issued Dec. 22, 2023 regarding International Application No. PCT/KR2022/014081, 7 pages.

Jiang et al., "Channel Sounding for Multi-AP CBF", doc.: IEEE 802.11-20-0123-00-00be, Jan. 2020, 14 pages.

Aio et al., "Consideration on Multi-AP Sounding", doc.: IEEE 802.11-19/1134r0, Jul. 2019, 13 pages.

Doostnejad et al., "Multi-AP Collaborative BF in IEEE 802.11", doc.: IEEE 802.11-19/0772r1, Jun. 2019, 18 pages.

* cited by examiner

| Element ID | Lower CQI Offset | Upper CQI Offset |
|---|---|---|
| 1 octet | 1 octet | 1 octet |

FIG. 11

| Element ID | CQI Offset | Interference Power Level |
|---|---|---|
| 1 octet | 1 octet | 1 octet |

| STA Info | STA MAC Address | Beacon Interval | DTIM Info | NSTR Indication Bitmap |
|---|---|---|---|---|
| 1 octet | 0 or 6 octets | 0 or 2 octets | 0 or 2 octet | 0 or 1 or 2 octets | ns # CQI ENHANCEMENT FOR MULTI-LINK OPERATION

CROSS-REFERENCE TO RELATED APPLICATION(S) AND CLAIM OF PRIORITY

This application claims priority under 35 U.S.C. § 119(e) to U.S. Provisional Patent Application No. 63/247,100 filed on Sep. 22, 2021, U.S. Provisional Patent Application No. 63/253,669 filed on Oct. 8, 2021, and U.S. Provisional Patent Application No. 63/275,314 filed on Nov. 3, 2021, which are hereby incorporated by reference in their entirety.

TECHNICAL FIELD

This disclosure relates generally to interference management in wireless communications systems that include multi-link devices. Embodiments of this disclosure relate to methods and apparatuses for enhancing channel quality measurements on links of a multi-link device in a wireless local area network (WLAN) communications system. Embodiments of this disclosure relate to methods and apparatuses for enhancing block acknowledgement functionality in extremely high throughput stations of a WLAN communications system.

BACKGROUND

WLAN technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD, thus providing an efficient way to utilize the available spectrum and achieve higher throughput than single-link operation.

MLO has two variations. The first type is simultaneous transmit/receive (STR) in which the stations (STAs) affiliated with an MLD can transmit and receive independent of each other. That is, an STR-capable MLD is able to simultaneously transmit on one link and receive on another link of an STR link pair. The second variation is non-simultaneous transmit/receive (NSTR) in which the links formed by the STAs affiliated with an MLD do not form an STR link pair. If a link pair constitutes an NSTR link pair, transmission on one link can cause interference to the other link due to signal leakiness which the device's radio transceiver is unable to withstand. Consequently, an MLD is unable to simultaneously transmit on one link and receive on another link of an NSTR link pair. Since the STR mode of operation requires two or more radios with sufficient isolation, it is expected that AP MLDs will have STR capabilities while non-AP MLDs are more likely not to be capable of STR, and thus use NSTR.

IEEE 802.11be supports explicit multiple-input and multiple-output (MIMO) compressed beamforming feedback allowing channel quality indicator (CQI) based feedback which provides information about the signal to noise ratio (SNR) of a resource unit (RU). 802.11be defines both multi-user (MU) CQI feedback and single-user (SU) CQI feedback.

Block acknowledgment (BA) is one of the major features that enables aggregation of multiple MAC Protocol Data Units (MPDUs) using one Aggregated MAC Protocol Data Unit (A-MPDU). With BA capability, multiple MPDUs in one A-MPDU can be acknowledged together in a single BA.

SUMMARY

Embodiments of the present disclosure provide methods and apparatuses for enhancing channel quality measurements on links of an MLD in a WLAN. Embodiments of this disclosure additionally provide methods and apparatuses for enhancing BA functionality in EHT STAs of a WLAN.

In one embodiment, a non-AP MLD is provided, comprising STAs and a processor operably coupled to the STAs. The STAs each comprise a transceiver configured to form a link with a corresponding AP affiliated with an AP MLD and to receive, over the link, a channel sounding signal. The processor is configured to determine, based on the channel sounding signal received at a first time over a first one of the links, an initial channel quality indicator (CQI) value for the first link, and to determine, based on interference caused on the first link by a second one of the links at a second time, a CQI offset value for the first link relative to the initial CQI value. The transceivers are configured to transmit, to the AP MLD, the initial CQI value and the CQI offset value In another embodiment, an AP MLD is provided, comprising APs and a processor operably coupled to the APs. The APs each comprise a transceiver configured to form a link with a corresponding STA affiliated with a non-AP MLD, and to transmit, to the corresponding STA over the link, a channel sounding signal. The transceivers are further configured to receive, from the non-AP MLD, an initial CQI value for a first one of the links, wherein the initial CQI value is based on the channel sounding signal received by the non-AP MLD at a first time over the first link, and to receive, from the non-AP MLD, a CQI offset value for the first link, wherein the CQI offset value is relative to the initial CQI value and is based on interference caused on the first link by a second one of the links at a second time. The processor is configured to determine, based on the initial CQI value and the CQI offset value, an updated CQI value for the first link at the second time.

In another embodiment, a method performed by a non-AP MLD that is configured to form links between STAs affiliated with the non-AP MLD and corresponding APs affiliated with an AP MLD is provided, including the steps of receiving, from the AP MLD, a channel sounding signal at a first time over a first one of the links, determining, based on the channel sounding signal, an initial channel quality indicator (CQI) value for the first link, transmitting, to the AP MLD, the initial CQI value, determining, based on interference caused on the first link by a second one of the links at a second time, a CQI offset value for the first link that is relative to the initial CQI value, and transmitting, to the AP MLD, the CQI offset value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example CQI offset frame format according to various embodiments of the present disclosure;

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the CQI sounding protocol in 802.11be is defined for MLDs for each link independently without considering the interference that may arise between pairs of links and how it may change dynamically after the sounding process is complete. This may cause a lot of sub-optimality in estimating the link quality for downlink (DL) transmission. To reflect these changes, embodiments of the present disclosure provide apparatuses and methods that optimize CQI sounding for MLDs to provide more information for the AP MLD.

Embodiments of the present disclosure additionally recognize that IEEE 802.11 baseline standard defines a protected BA mechanism where scoreboard context can only be updated using a robust Add Block ACK (ADDBA) Request frame that updates $WinStart_B$ and $WinSize_B$, where a Block ACK Request (BAR) frame is only used to indicate reception status. The recipient advances the windows after validation and responds with a robust ADDBA Response frame. After the handshake is complete, the originator updates its windows ($WinStart_O$ and $WinSize_O$) accordingly. The reason is that the ADDBA Request and ADDBA Response frames are management frames that can be protected while control frames such as the BAR frame cannot be protected. Hence, BAR is not robust against attacks that may disrupt the reorder buffer by changing buffer windows.

STAs that can support protected BA indicate this by setting a capability field called Protected BA Agreement Capable (PBAC) in Robust Security Network Element (RSNE) to 1. There have been reports that many legacy devices in the market falsely set PBAC to 1 (meaning that they set PBAC to 1 while they are not capable of setting up a protected BA agreement). Hence, the originator or recipient may assume that the other side is capable of establishing a Protected BA agreement while in practice it still advances its buffer windows based on BAR update. Therefore, the BA agreement will be vulnerable to attacks even though it may seem that a protected block ACK agreement is in place. Accordingly, embodiments of the present disclosure provide apparatuses and methods that avoid misunderstandings by EHT STAs in cases in which PBAC is set to 1 incorrectly which falsely implies that a protected BA agreement is in place while in fact it is not protected from attacks that target the BAR control frame.

Figure 1:
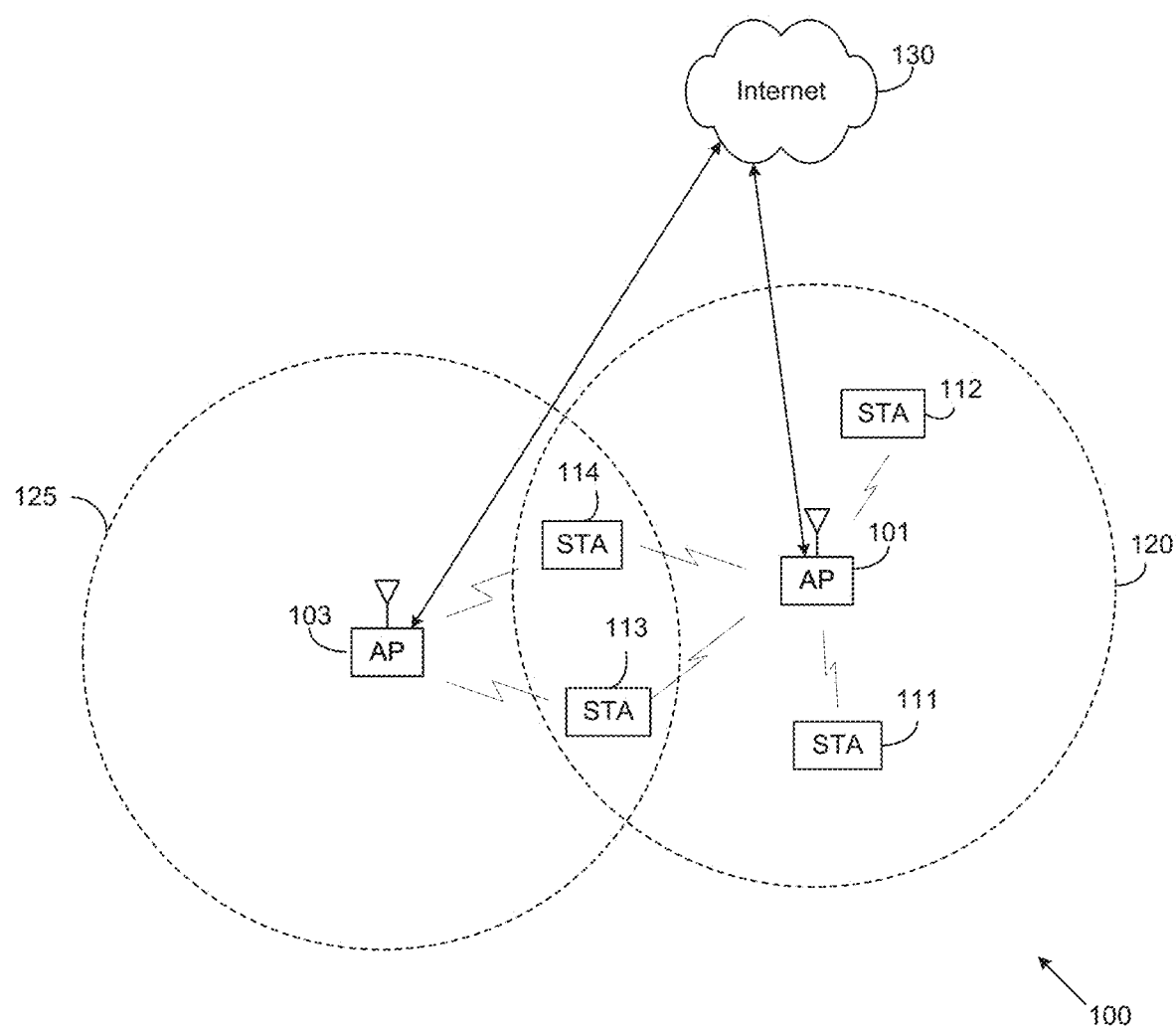
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, at least one of the APs 101 and 103 and at least one of the STAs 111-114 may be an MLD. In such embodiments, AP 101 may be an AP MLDs, and STA 111 may be a non-AP MLD. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions. The coverage areas 120 and 125 may be considered to correspond to BSSs of the associated APs 101 and 103, respectively. Coverage area 120 may be considered an OBSS with respect to the BSS of AP 103, and vice versa for the coverage area 125 with respect to the BSS of AP 101.

As described in more detail below, one or more of the APs may include circuitry and/or programming for facilitating enhanced CQI sounding on links of an MLD or enhanced BA functionality in EHT STAs in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
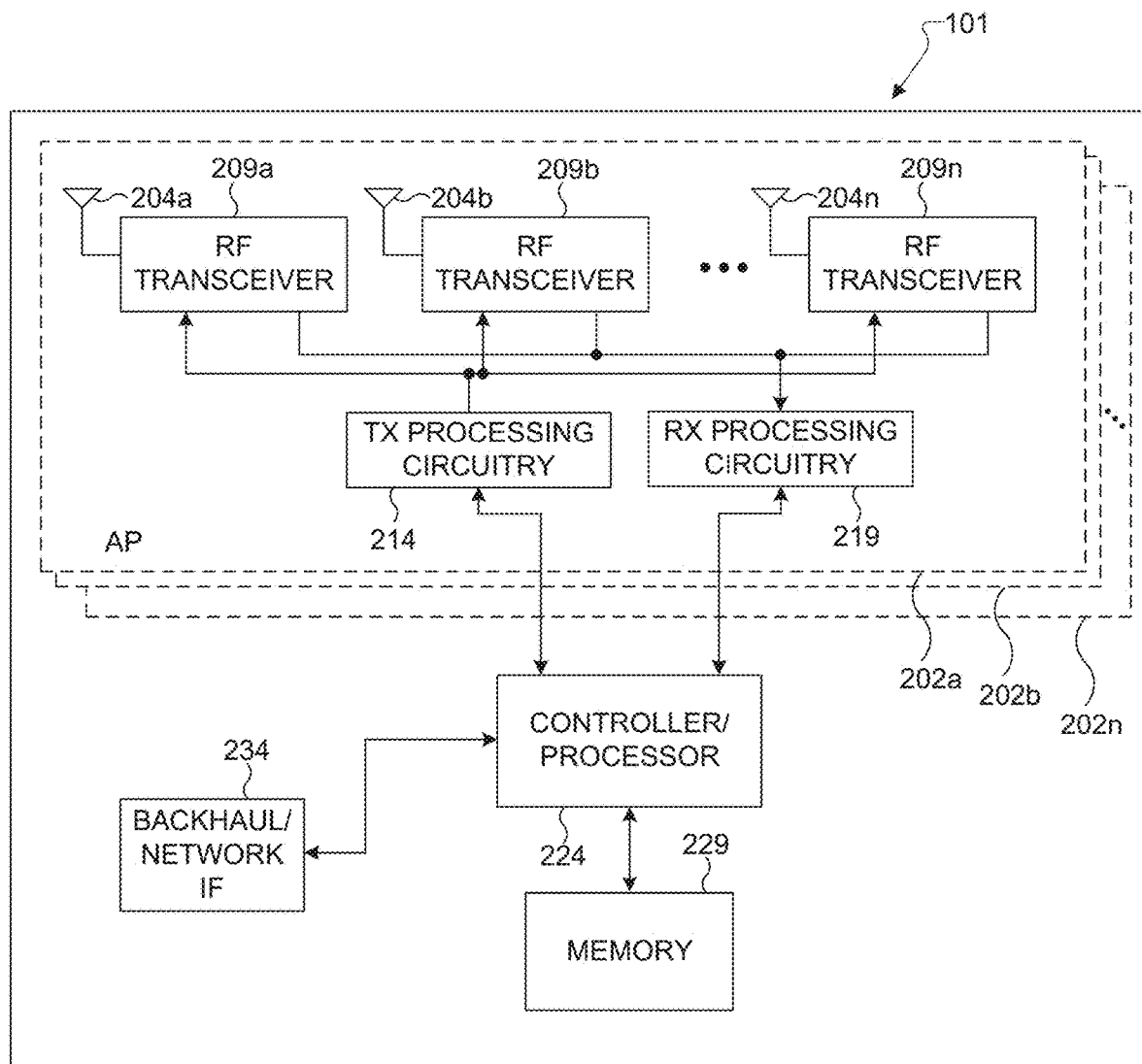
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating enhanced CQI sounding on links of an MLD or enhanced BA functionality in EHT STAs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating enhanced CQI sounding on links of an MLD or enhanced BA functionality in EHT STAs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs. For example, if AP 101 is not an AP MLD, the APs 202b-202n may be omitted.

Figure 2B:
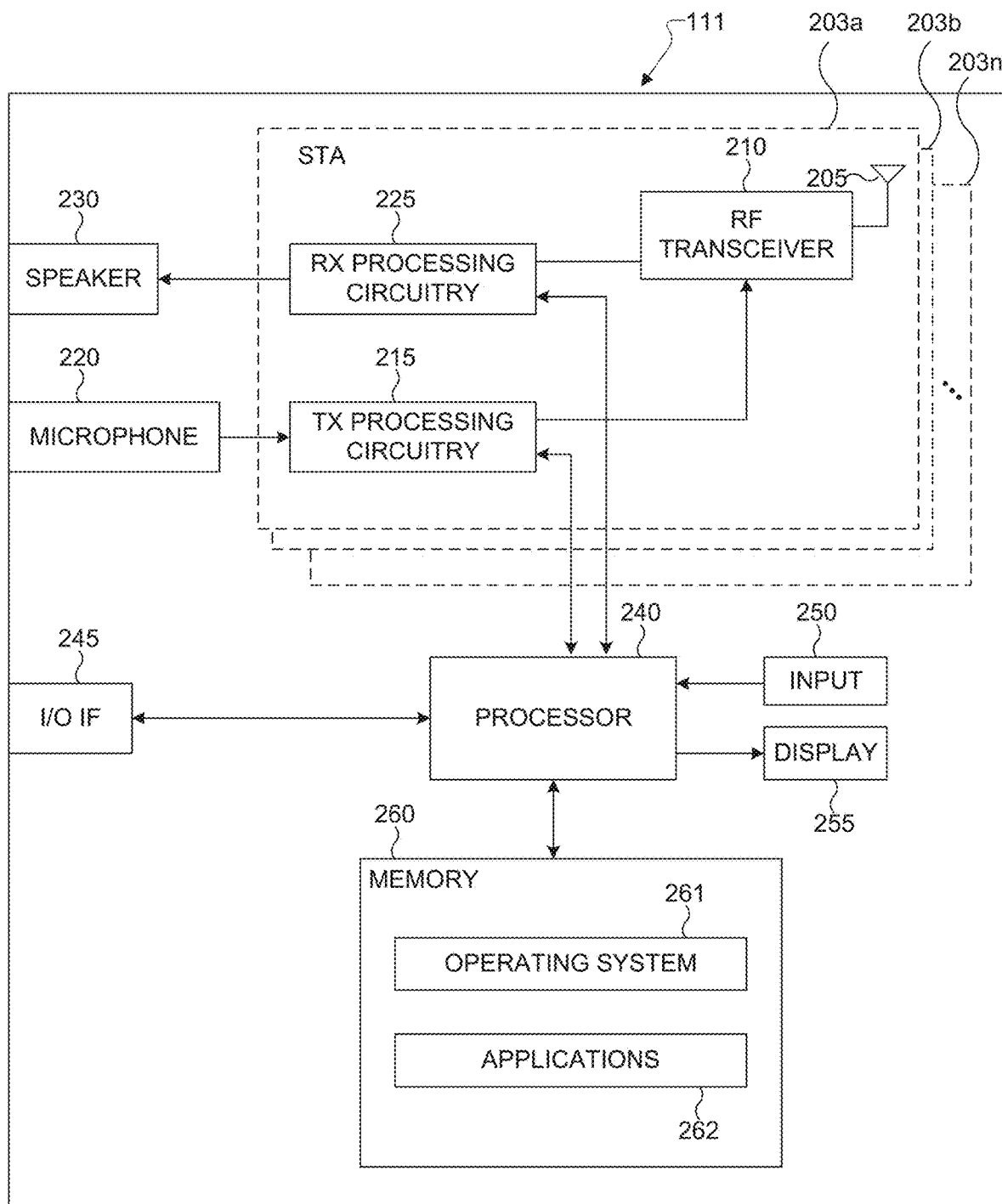
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate enhanced CQI sounding on links of an MLD or enhanced BA functionality in EHT STAs in WLANs. In some embodiments, the controller/processor 240 includes at least one microprocessor or microcontroller.

The controller/processor 240 is also capable of executing other processes and programs resident in the memory 260, such as operations for facilitating enhanced CQI sounding on links of an MLD or enhanced BA functionality in EHT STAs in WLANs. The controller/processor 240 can move data into or out of the memory 260 as required by an executing process. In some embodiments, the controller/processor 240 is configured to execute a plurality of applications 262, such as applications for facilitating enhanced CQI sounding on links of an MLD or enhanced BA functionality in EHT STAs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). In embodiments in which the STA 111 is not an MLD, the STAs 203b-203n may be omitted. Also, while FIG. 2B illustrates the non-AP MLD 111 configured as a mobile telephone or smartphone, non-AP MLDs can be configured to operate as other types of mobile or stationary devices.

As discussed above, in dense networks multiple APs operate in the vicinity of each other, and in these scenarios OBSS interference is prevalent. In this disclosure a link suffering from OBSS interference is referred to as a victim link (or suffering link) and the STA associated with this link is referred to as a victim STA (or suffering STA).

To improve the performance of the victim link, the AP associated with it could begin a MAP negotiation with the interfering AP. During this MAP negotiation the schedule of the victim STA is announced to the interfering AP asking it to silence the interfering link for the duration for which the victim link is active. In this disclosure it is assumed that the AP initiating the MAP coordination request knows the schedule of the victim link. For example, the schedule can be predicted by the AP based on power saving schemes like TWT and PSM that are established between the AP and the victim STA. It is also assumed that the interfering link forms an NSTR link pair with another link in an MLD. The embodiments discussed below detail the behavior of an AP MLD and its associated non-AP MLD upon receiving such a MAP coordination request.

Figure 3:
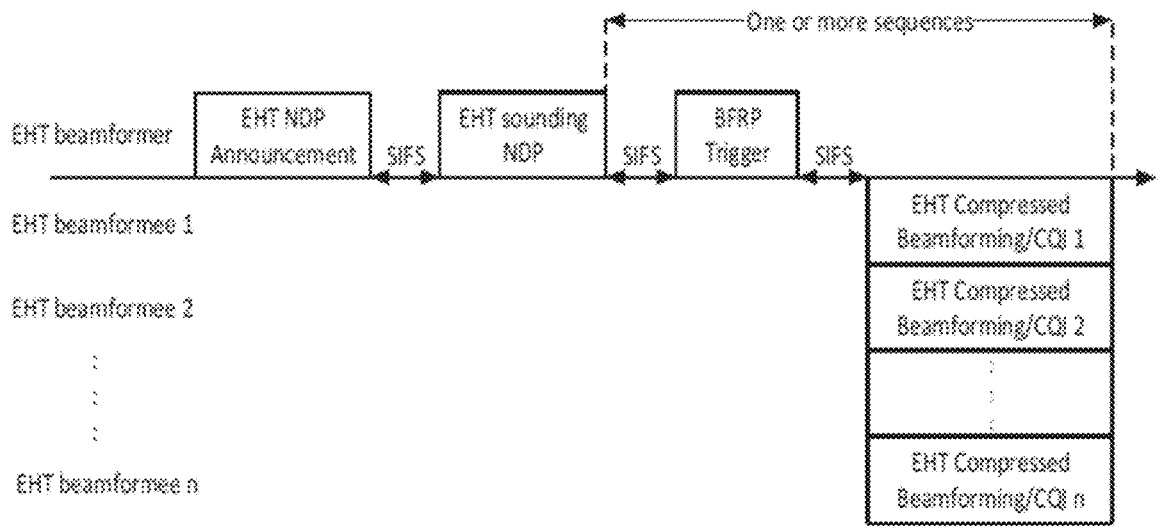
FIG. 3 illustrates an example timing diagram for MU CQI feedback according to embodiments of the present disclosure.

FIG. 3 illustrates an example timing diagram for MU CQI feedback according to embodiments of the present disclosure. MU CQI feedback is defined using an EHT null data packet announcement (NDPA) followed by an EHT null data packet (NDP) transmitted by an AP MLD (e.g., a beamformer) with a short inter-frame space (SIFS) separation. The EHT NDP is followed by a beamforming report poll (BRP or BFRP) after a SIFS duration, and STAs (e.g., beamformees) report CQI in EHT after a SIFS duration.

Figure 4:
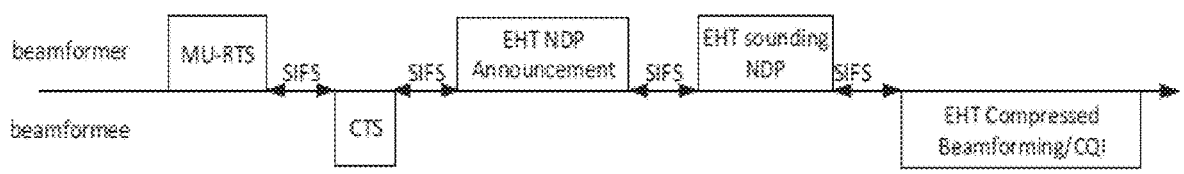
FIG. 4 illustrates an example timing diagram for SU CQI feedback according to embodiments of the present disclosure.

FIG. 4 illustrates an example timing diagram for SU CQI feedback according to embodiments of the present disclosure. Similar to the MU CQI feedback of FIG. 4, SU CQI feedback is defined using an EHT NDPA followed by an EHT NDP transmitted by an AP MLD with a SIFS separation. A BRP is not used in the case of SU CQI feedback. Accordingly, STAs report CQI in EHT a SIFS duration after the EHT NDP is transmitted.

For MLDs, CQI sounding through a sounding NDP follows the same constraints of the link pair constraints. Moreover, CQI sounding is not synchronized on multiple links which means that CQI sounding can capture interference between multiple links in MLO in a random manner. For example, for an NSTR link pair, CQI sounding may have many possible scenarios such as the scenarios in FIGS. 5 and 6.

Figure 5:
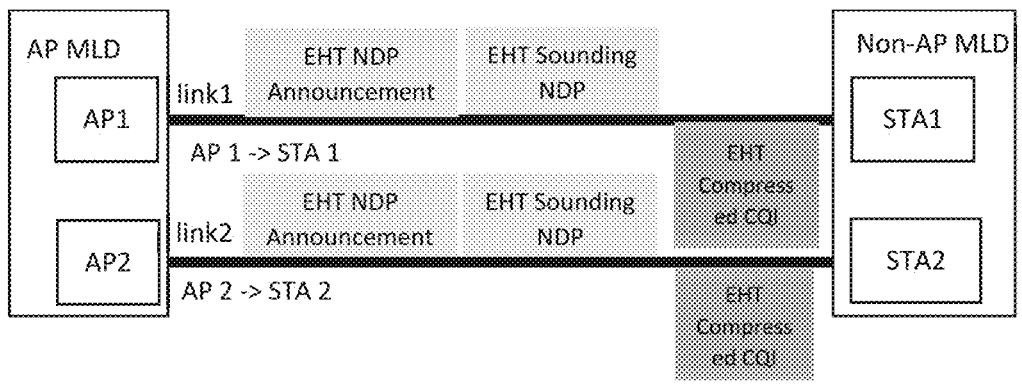
FIGS. 5 and 6 illustrate example timing diagrams for CQI sounding for an NSTR link pair according to embodiments of the present disclosure.
Figure 6:
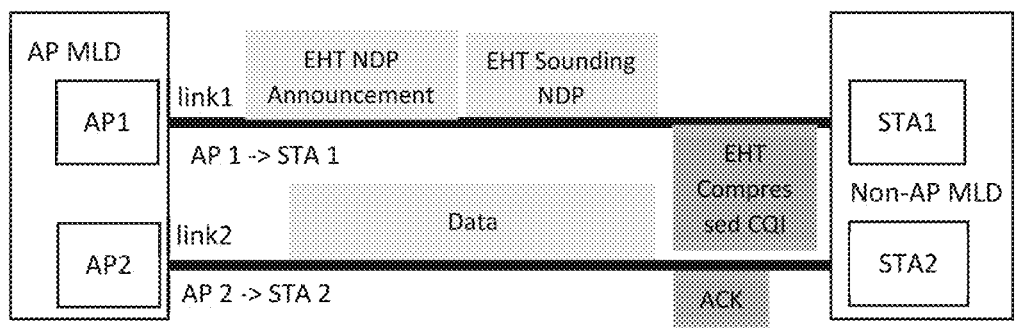

FIGS. 5 and 6 illustrate example timing diagrams for CQI sounding for an NSTR link pair according to embodiments of the present disclosure. In the example of FIG. 5, CQI sounding happens to occur at the same time for both links of NSTR link pair (i.e., CQI sounding happens to be synchronized on both links). In the example of FIG. 6, CQI sounding packets are transmitted in the DL on Link1 while Link2 is performing regular DL PPDU data transmission. In both cases, due to NSTR constraints, interference from each link to the other is not included in CQI calculation at STA1 nor at STA2.

For an STR link pair, many scenarios may occur in which CQI sounding provides inaccurate results due to independent transmission on each of the link pair, as captured in FIGS. 7-10, which illustrate example timing diagrams for CQI sounding for an STR link pair according to embodiments of the present disclosure.

Figure 7:
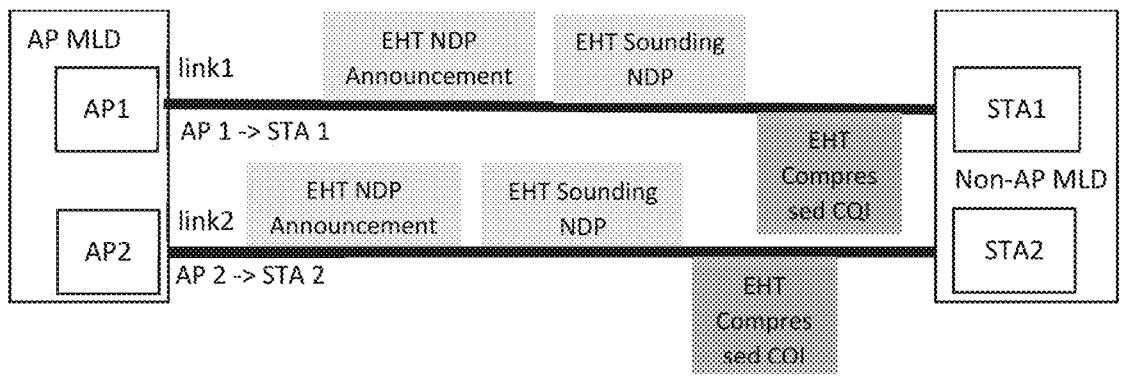
FIGS. 7-10 illustrate example timing diagrams for CQI sounding for an STR link pair according to embodiments of the present disclosure.

In FIG. 7, the EHT sounding NDP on Link1 partially overlaps with the EHT Compressed CQI report UL frame transmitted on Link2. Accordingly, the EHT Compressed CQI report UL frame interferes with the CQI sounding of the EHT sounding NDP.

Figure 8:
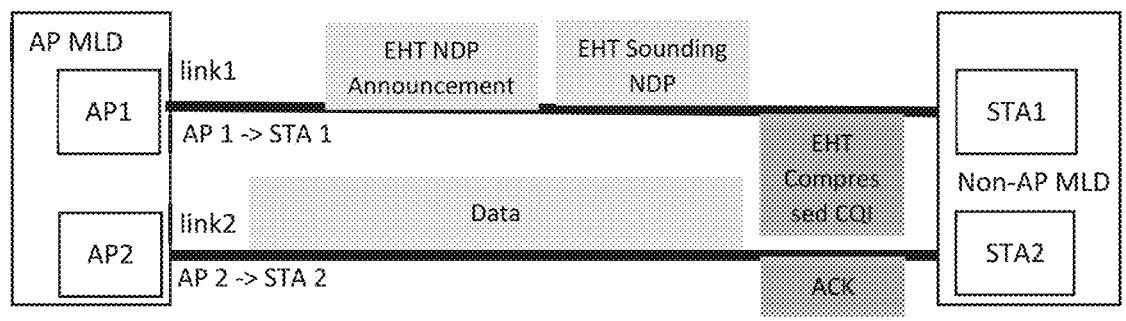

In FIG. 8, even though the link pair is STR, scheduling on both links is aligned in a way that does not capture any interference between the two links, as the DL end times are synchronized. Also, since the UL response is one SIFS away in both cases, the UL start times are also synchronized.

Figure 9:
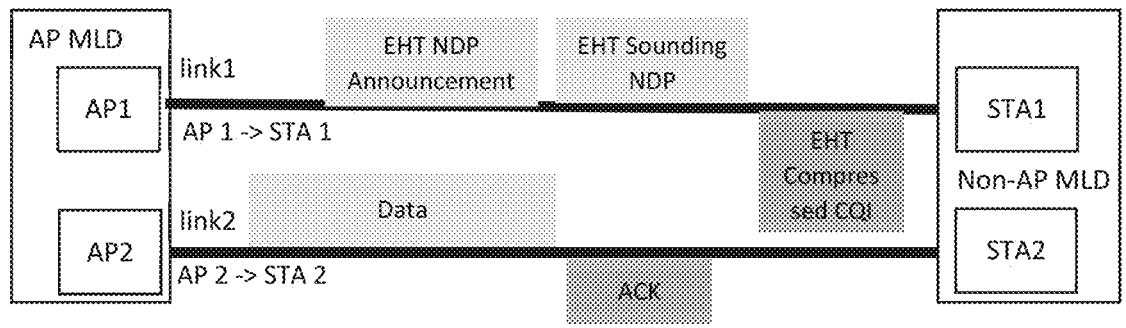

In FIG. 9, the interference caused by Link2 on the Link1 EHT NDP sounding frame is due to the ACK signal being transmitted on Link2.

Figure 10:
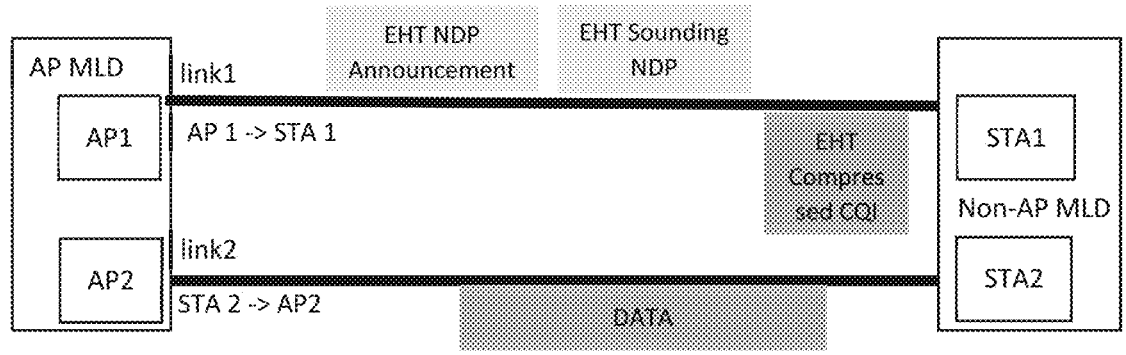

In FIG. 10, the CQI calculation for Link1 will capture interference due to the UL data PPDU on Link2 which follows Link2 adaptation.

In various use cases, CQI calculations under scenarios such as the above will not be optimized for future scheduling instances due to the CQI sounding procedure not capturing the actual situation for DL PPDU transmission. For example, if a non-AP MLD can accurately notify the AP MLD of its link pair interference tolerance, the AP MLD may have the ability to override the NSTR mode of non-AP STAs. The AP MLD would need to be aware of accurate link pair tolerable interference to adjust each link transmission to do this.

As another example, a link pair operating in STR mode may contain link pair interference in its CQI sounding. If the link pair switches to NSTR mode, however, its CQI sounding should have zero interference from the other link in the pair. Similarly, a link going from NSTR to STR will not include link pair interference (due to measuring CQI under NSTR constraint assumption) while it should include interference from the other link in the pair when operating in STR conditions.

As another example, even if it is in STR mode, an AP MLD may be operating in an NSTR-like mode due to scheduling (similar to FIG. 8), hence a better CQI estimate may be needed. In yet another example, temporary link muting may occur, which could change the amount of link pair interference for the period of the muting.

Various embodiments of the disclosure facilitate enhanced CQI reporting by a non-AP MLD. Additionally, the disclosure provides a frame format that includes extra information that reflects the interference between a link pair. This happens by giving the AP MLD access to two CQI values or a CQI interval. For example, one value includes link pair interference and another value does not account for link pair interference.

In one embodiment, a CQI offset frame is provided that can be either transmitted from the non-AP MLD to the AP MLD based on the request of the AP MLD, or announced by the non-AP MLD. This frame contains two offset values to add and to subtract, respectively, from a previously reported CQI value at each link of a link pair between the AP MLD and the non-AP MLD.

FIG. 11 illustrates an example CQI offset frame format according to various embodiments of the present disclosure. The frame may contain an Element ID, a Lower CQI Offset field containing a lower CQI offset value, and an Upper CQI Offset field containing an upper CQI offset value. The lower CQI offset value may be subtracted from a previously reported CQI value, and the upper CQI offset value may be added to a previously reported CQI value in order to obtain a range of CQI values. In this way, the AP MLD can have access to a range of CQI values. The AP MLD can then use the CQI value appropriate for the link pair status and for the scheduling instant.

For various use cases of the CQI offset, a certain procedure may be followed to update the CQI value at the AP MLD using the CQI offset frame of FIG. 11. Some of those cases and procedures are discussed herein below.

Figure 12:
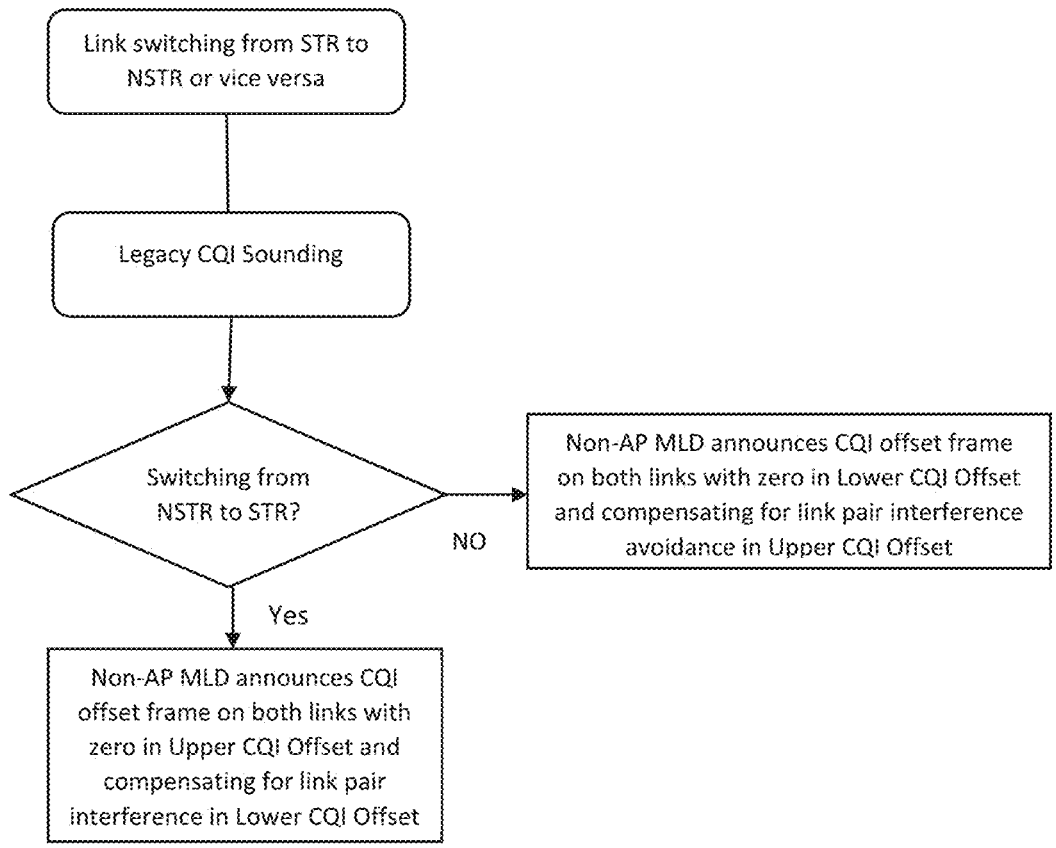
FIG. 12 illustrates an example procedure for utilization of a CQI offset frame for dynamic switching between STR and NSTR according to various embodiments of the present disclosure.

FIG. 12 illustrates an example procedure for utilization of a CQI offset frame for dynamic switching between STR and NSTR according to various embodiments of the present disclosure. In the case of a link pair that is dynamically switching from STR to NSTR or vice versa, the non-AP MLD announces the CQI offset frame on both links. Based on this, the AP MLD can update the reported CQI.

If a link is dynamically switching from STR to NSTR, then CQI should not count for link pair interference (due to DL and UL synchronization of the NSTR link pair). In this instance, the announced CQI offset frame may have a value of zero in the Lower CQI Offset field while the value in the Upper CQI Offset field may compensate link pair interference so that a previously reported CQI value (measured under STR conditions) can be increased using the Upper CQI Offset value.

If a link is dynamically switching from NSTR to STR, then link pair interference should be considered in the CQI calculation. Hence, the non-AP MLD may announce a CQI Offset frame with a value of zero in Upper CQI Offset field and may compensate link pair interference by including a Lower CQI Offset value to be subtracted from a previously reported CQI value (measured under NSTR constraints).

Figure 13:
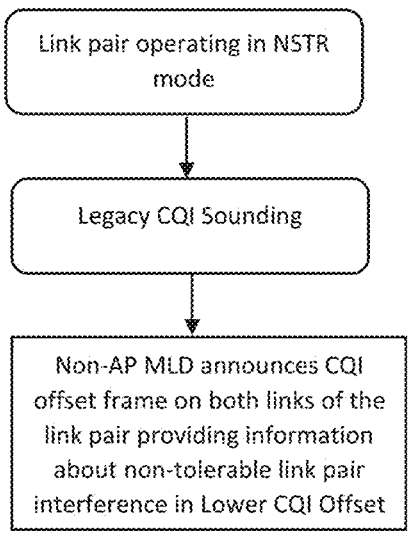
FIG. 13 illustrates an example procedure for utilization of a CQI offset frame to inform an AP MLD of non-tolerable interference between a link pair leading to NSTR mode of operation according to various embodiments of the present disclosure.

FIG. 13 illustrates an example procedure for utilization of a CQI offset frame to inform an AP MLD of non-tolerable interference between a link pair leading to NSTR mode of operation according to various embodiments of the present disclosure. According to this embodiment, a non-AP MLD operating in NSTR mode may announce a CQI offset frame that includes link pair interference in a way that enables the AP MLD to override the NSTR conditions.

Generally, a link pair operating in NSTR mode will not count for link pair interference due to synchronized UL and DL transmission being applied to satisfy NSTR constraints. However, if the AP MLD knows the amount of leakage from Link1 to Link2 which made the non-AP MLD operate in NSTR mode, it may be able to override this decision either using some link adaptation for its DL transmission or by adjustment of transmit power at both links so that it can enable STR transmission. Informing the AP MLD of the leakage value is crucial as it is implementation-dependent and each non-AP MLD will have its own constraints due to its hardware design. In this case, the non-AP MLD with an NSTR link pair may announce a CQI offset frame that compensates for link pair interference using the Lower CQI Offset value, and may set the Upper CQI Offset value to zero.

Figure 14:
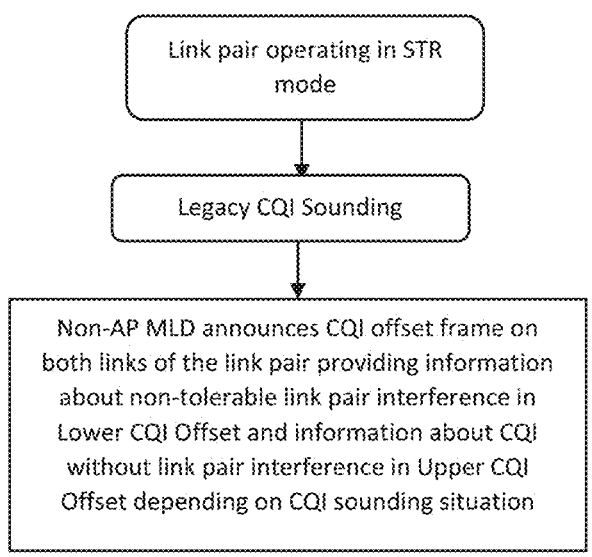
FIG. 14 illustrates an example procedure for utilization of a CQI offset frame to inform an AP MLD of a CQI sounding situation on a link pair according to various embodiments of the present disclosure.

FIG. 14 illustrates an example procedure for utilization of a CQI offset frame to inform an AP MLD of a CQI sounding situation on a link pair according to various embodiments of the present disclosure. As discussed above, CQI sounding is done independently on each link pair. Hence, a CQI sounding procedure in STR mode may not be aligned with the actual scheduling process. For example, CQI sounding may include UL control interference from the other link in the link pair, or UL PPDU interference, or even zero interference if sounding on one link does not overlap with any UL transmission on the other link. However, the actual scheduling on both links may be different from what is captured during the CQI sounding situation (as illustrated in the examples in FIGS. 7-10).

In this case, if a link pair is operating in STR mode, as the non-AP MLD is aware of the situation that was happening during the CQI sounding procedure, the non-AP MLD may announce a CQI offset frame on both links to inform the AP MLD of the CQI range that needs to be utilized when scheduling is happening on both links. The CQI offset frame may provide information about non-tolerable link pair interference using the Lower CQI Offset value, and may provide information about CQI without link pair interference using the Upper CQI Offset value, depending on the CQI sounding situation.

Figures 15, 16, 17:
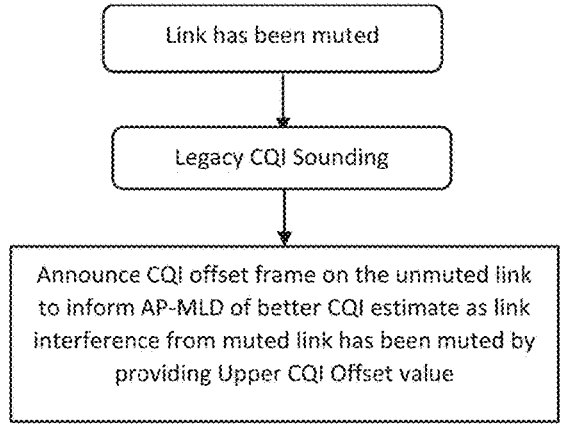
FIG. 15 illustrates an example procedure for utilization of a CQI offset frame in the case of link muting according to various embodiments of the present disclosure.
FIG. 16 illustrates an alternative example CQI offset frame format according to various embodiments of the present disclosure.
FIG. 17 illustrates another alternative example CQI offset frame format according to various embodiments of the present disclosure.

FIG. 15 illustrates an example procedure for utilization of a CQI offset frame in the case of link muting according to various embodiments of the present disclosure. Link muting is used for WI-FI to allow co-existence with other technologies like radar, etc. In some cases, temporary link muting may be used, whereby a link is muted for a period of time for multiple purposes. When a link pair is STR, link pair interference will be captured in CQI sounding. However, if link muting happens on one of the two links in the link pair, then a previously reported CQI value may be more conservative than the actual situation merits as one of the two links is fully silent.

In such a case, if the non-AP MLD is initiating the link muting on one of the two links, then it announces a CQI offset frame on the other link so that the AP MLD can update its previously obtained CQI value. If the AP MLD is responsible for taking the action of link muting, then it will request the non-AP MLD to report a CQI offset frame on the other link (that is not muted) to update its previously obtained CQI value. The provided CQI offset frame may provide information about CQI without link pair interference using the Upper CQI Offset value.

FIG. 16 illustrates an alternative example CQI offset frame format according to various embodiments of the present disclosure. According to this embodiment, the CQI offset frame contains a CQI offset field that includes one value representing CQI offset for the measurement link, along with an Interference Power Level field that includes a value representing UL interference power on the other link during CQI measurement on the first link.

In this case, the AP MLD may map the pair of CQI offset and UL interference power values to a pre-defined CQI offset value. This pre-defined CQI offset value can be obtained from a pre-defined look-up table or something similar.

FIG. 17 illustrates another alternative example CQI offset frame format according to various embodiments of the present disclosure. This embodiment includes link pair interference level in the STA Info field, and the NSTR Indication Bitmap is used as follows. Instead of including a bitmap to represent NSTR link pair indication, 2 or more bits of the NSTR Indication Bitmap can be used for each link pair to provide quantized information representing the interference level between each link pair. That is, a numerical level of interference (e.g., level 0, 1, 2, etc.) can be provided instead of a binary representation. In such a case, a zero value would mean STR while any non-zero value would be NSTR with link pair interference as reflected in the NSTR Indication Bitmap value.

Figure 18:
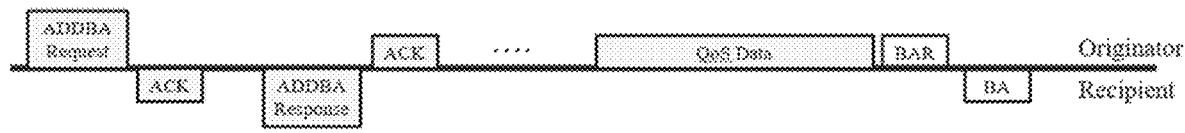
FIG. 18 illustrates a procedure for immediate BA agreement setup and data transfer and acknowledgment according to various embodiments of the present disclosure.

FIG. 18 illustrates a procedure for immediate BA agreement setup and data transfer and acknowledgment according to various embodiments of the present disclosure. As discussed above, in this procedure, the ADDBA Request and ADDBA Response frames are management frames that can be protected while control frames such as the BAR frame cannot be protected. Hence, BAR is not robust against attacks that may disrupt the reorder buffer by changing buffer windows. If a device falsely sets the PBAC field in the RSNE to 1 while it is not capable of setting up a protected BA agreement, the BA agreement will be vulnerable to attacks even though it may seem that a protected block ACK agreement is in place because the originator or recipient may assume that the other side is capable of establishing a Protected BA agreement while in practice it still advances its buffer windows based on BAR update.

In one embodiment, in order to avoid this issue, the PBAC field in the RSNE is ignored when one or both sides of the BA agreement (originator and recipient) is an EHT STA. In this case, a new PBAC field can be introduced in a Robust Security Network Extended Element (RSNXE) to indicate the capability for protected BA agreement. In this solution, a non-EHT STA cannot set up a protected BA agreement with an EHT STA because it cannot use the RSNXE and at the same time its PBAC field in the RSNE is ignored from the EHT STA side.

In another embodiment, the PBAC field in the RSNE is not ignored, but a protected BA agreement is established when the PBAC field in the RSNE and the PBAC field in the RSNXE are both set to 1.

In another embodiment, a procedure for a pair of originator and recipient STAs is provided in which one of the pair is an EHT STA that detects if a PBAC setting by the non-EHT STA is intended or it was falsely set.

Figure 19:
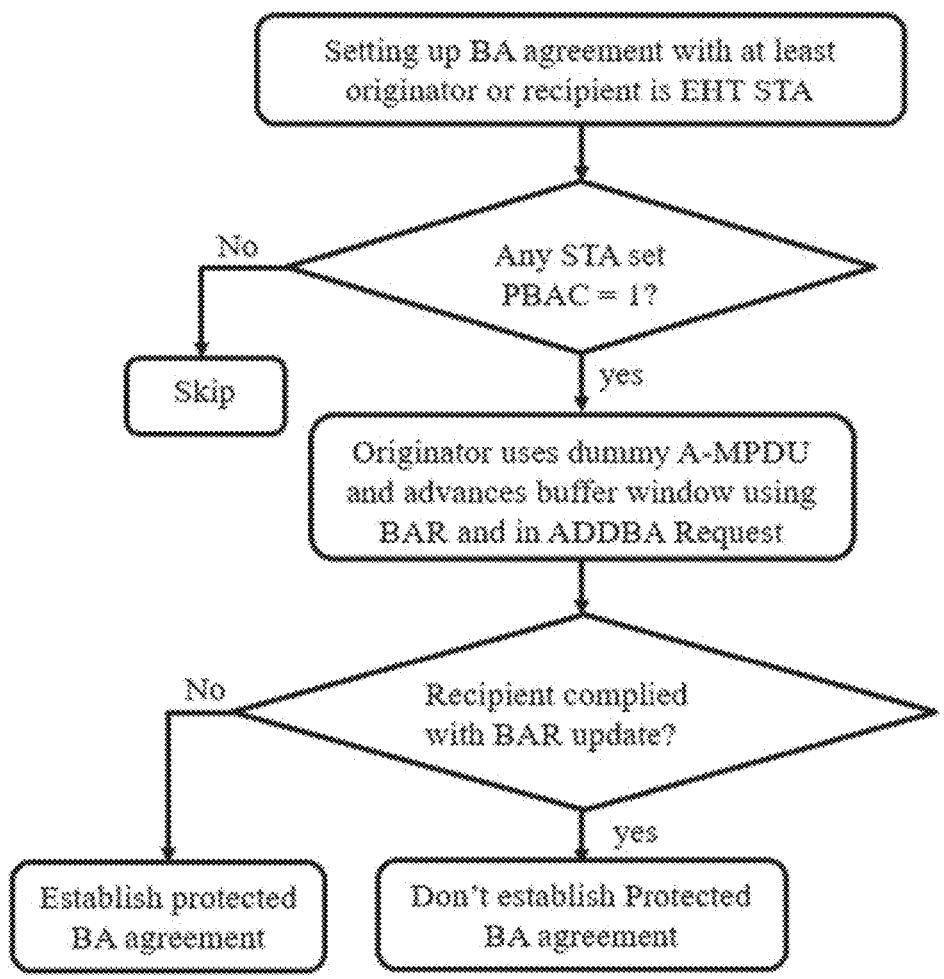
FIG. 19 illustrates an example procedure for detection of a false PBAC indication according to various embodiments of the present disclosure.

FIG. 19 illustrates an example procedure for detection of a false PBAC indication according to various embodiments of the present disclosure. In this procedure, the EHT STA can use a dummy buffer to transmit the smallest A-MPDU to check if a PBAC agreement is in place. The EHT STA can update the buffer window size using a BAR frame. The EHT STA can update the buffer window size differently using ADDBA Request and complete the handshake using ADDBA response. After that, the EHT STA can check to see if the non-EHT STA complied with the buffer window update that was transmitted in the BAR frame.

This check can be performed in a number of ways. For example, the EHT STA can request for the non-EHT STA to re-transmit the same dummy A-MPDU or the received sequence numbers (SNs) and compare the data with the original dummy frame. Alternatively, the EHT STA can request for the non-EHT STA to share buffer window parameters to determine whether it complied with BAR buffer window update or not.

Figure 20:
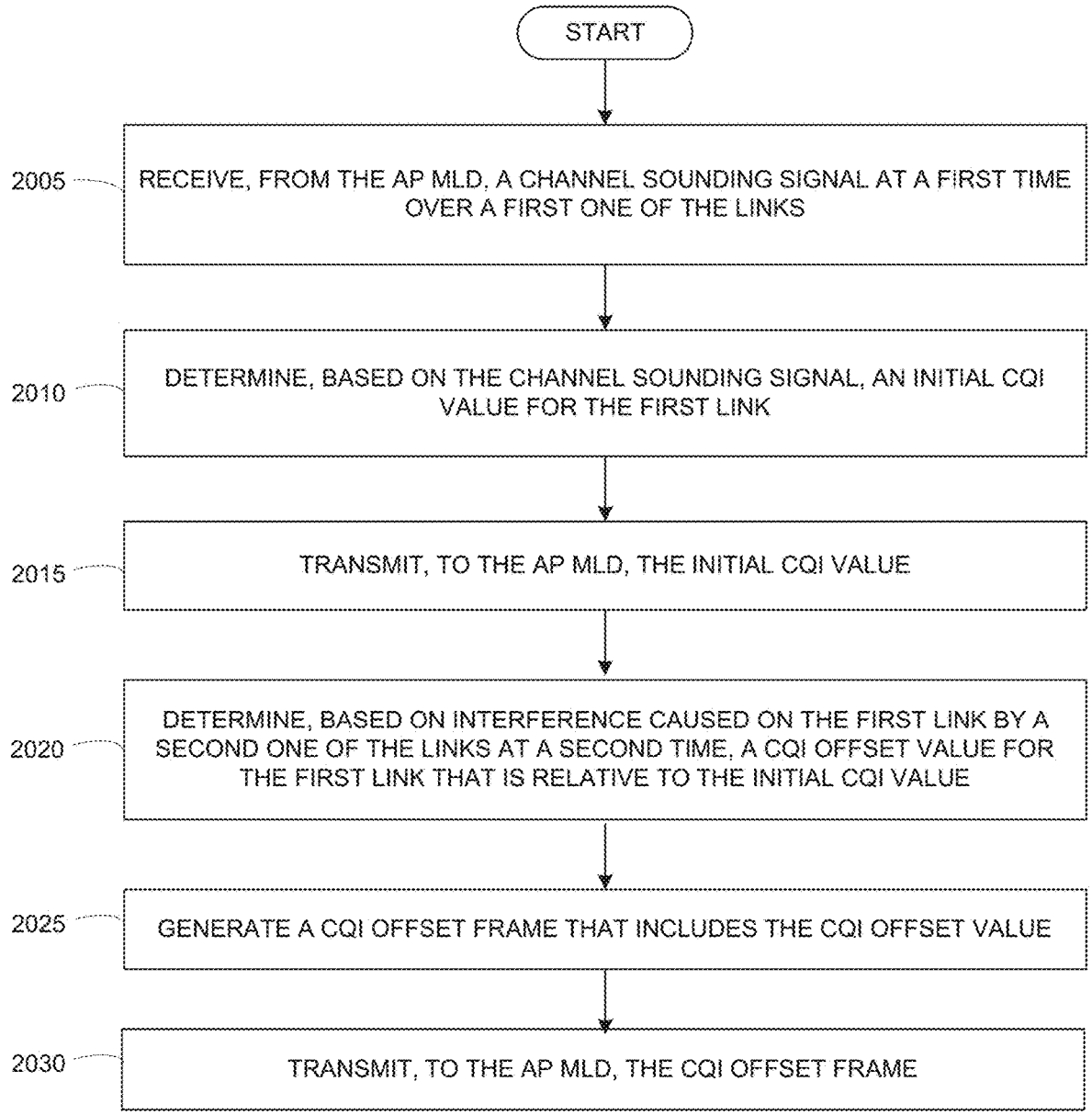
FIG. 20 illustrates an example process for facilitating enhanced channel quality measurements on links of an MLD according to various embodiments of the present disclosure.

FIG. 20 illustrates an example process for facilitating enhanced channel quality measurements on links of an MLD according to various embodiments of the present disclosure. The process of FIG. 20 is discussed as being performed by a non-AP MLD, but it is understood that a corresponding AP MLD performs a corresponding process. Additionally, for convenience, the process of FIG. 20 is discussed as being performed by a WI-FI non-AP MLD comprising a plurality of STAs that each comprise a transceiver configured to form a link with a corresponding AP of an AP MLD. However, it is understood that any suitable wireless communication device could perform these processes.

The process begins with the non-AP MLD receiving, from the AP MLD, a channel sounding signal at a first time over a first one of the links (step 2005).

Then, the non-AP MLD determines, based on the channel sounding signal, an initial CQI value for the first link (step 2010) and transmits, to the AP MLD, the initial CQI value (step 2015).

Next, the non-AP MLD determines, based on interference caused on the first link by a second one of the links at a second time, a CQI offset value for the first link that is relative to the initial CQI value (step 2020).

The non-AP MLD then generates a CQI offset frame that includes the CQI offset value (step 2025). In some embodiments, the CQI offset frame indicates whether to increase or decrease the initial CQI value by the CQI offset value to obtain an updated CQI value for the first link at the second time. The CQI offset frame may be generated to include the CQI offset value as a lower CQI offset value and an upper CQI offset value, such that an updated CQI value for the first link at the second time is obtained or determined by the AP MLD by subtracting the lower CQI offset value from the initial CQI value or adding the upper CQI offset value to the initial CQI value.

Finally, the non-AP MLD transmits the CQI offset frame to the AP MLD (step 2030).

In some embodiments, the first link and the second link form a link pair that can dynamically switch between STR mode and NSTR mode. If the link pair switches from STR mode to NSTR mode between the first time and the second time, then at step 2025 the lower CQI offset value is set to zero and the upper CQI offset value is set to an amount that reflects additional interference in the link pair relative to the initial CQI value. Alternatively, if the link pair switches from NSTR mode to STR mode between the first time and the second time, then at step 2025 the lower CQI offset value is set to an amount that reflects reduced interference in the link pair relative to the initial CQI value and the upper CQI offset value is set to zero. In these cases, at step 2030 the non-AP MLD transmits the CQI offset frame to the AP MLD over the first link and the second link.

In some embodiments, the first link and the second link form an STR link pair. Based on a determination that interference in the link pair at the second time is different than interference in the link pair at the first time, at step 2025 the non-AP MLD sets the lower CQI offset value to an amount that reflects a non-tolerable amount of interference in the link pair relative to the initial CQI value and sets the upper CQI offset value to an amount that reflects no interference in the link pair relative to the initial CQI value. Then, at step 2030 the non-AP MLD transmits the CQI offset frame to the AP MLD over the first link and the second link.

In some embodiments, at step 2025 the non-AP MLD generates a CQI offset frame that includes the CQI offset value for the first link and an uplink interference power level on the second link at the first time. An updated CQI value for the first link is then obtained or determined by the AP MLD based on the CQI offset value and the uplink interference power level.

In some embodiments in which the links form link pairs, at step 2025 the non-AP MLD generates a CQI offset frame that includes an NSTR indication bitmap in which, for each link pair, two or more bits represent a value that reflects an interference level in the corresponding link pair.

The above flowcharts illustrate an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:
stations (STAs) each comprising a transceiver configured to:
form a link with a corresponding AP affiliated with an AP MLD, and
receive, from the corresponding AP over the link, a channel sounding signal; and
a processor operably coupled to the STAs, the processor configured to:
determine, based on the channel sounding signal received at a first time over a first one of the links, an initial channel quality indicator (CQI) value for the first link, and
determine, based on interference caused on the first link by a second one of the links at a second time, a CQI offset value for the first link that is relative to the initial CQI value, and
generate a CQI offset frame that includes the CQI offset value for the first link and an uplink interference power level on the second link at the first time, wherein an updated CQI value for the first link is obtained based on the CQI offset value and the uplink interference power level, and
wherein the transceivers are further configured to:
transmit, to the AP MLD, the initial CQI value, and
transmit, to the AP MLD, the CQI offset frame including the CQI offset value.

2. The non-AP MLD of claim 1, wherein the CQI offset frame indicates whether to increase or decrease the initial CQI value by the CQI offset value to obtain the updated CQI value for the first link at the second time.

3. The non-AP MLD of claim 1, wherein:
the CQI offset frame includes the CQI offset value as a lower CQI offset value and an upper CQI offset value, and
the updated CQI value for the first link at the second time is obtained by subtracting the lower CQI offset value from the initial CQI value or adding the upper CQI offset value to the initial CQI value.

4. The non-AP MLD of claim 3, wherein:
the first link and the second link form a link pair,
the processor is further configured to:
  based on a determination to switch the link pair from a simultaneous transmit/receive (STR) mode to a non-simultaneous transmit/receive (NSTR) mode between the first time and the second time, set the lower CQI offset value to zero and set the upper CQI offset value to an amount that reflects additional interference in the link pair relative to the initial CQI value; or
  based on a determination to switch the link pair from the NSTR mode to the STR mode between the first time and the second time, set the lower CQI offset value to an amount that reflects reduced interference in the link pair relative to the initial CQI value and set the upper CQI offset value to zero, and
the transceivers are configured to transmit, to the AP MLD over the first link and the second link, the CQI offset frame.

5. The non-AP MLD of claim 3, wherein:
the first link and the second link form a simultaneous transmit/receive (STR) link pair,
the processor is further configured to, based on a determination that interference in the link pair at the second time is different than interference in the link pair at the first time, set the lower CQI offset value to an amount that reflects a non-tolerable amount of interference in the link pair relative to the initial CQI value and set the upper CQI offset value to an amount that reflects no interference in the link pair relative to the initial CQI value, and
the transceivers are configured to transmit, to the AP MLD over the first link and the second link, the CQI offset frame.

6. The non-AP MLD of claim 1, wherein:
the links form link pairs, and
the CQI offset frame further includes a non-simultaneous transmit/receive (NSTR) indication bitmap in which, for each link pair, two or more bits represent a value that reflects an interference level in the corresponding link pair.

7. An access point (AP) multi-link device (MLD) comprising:
APs each comprising a transceiver configured to:
  form a link with a corresponding station (STA) affiliated with a non-AP MLD,
  transmit, to the corresponding STA over the link, a channel sounding signal,
  receive, from the non-AP MLD, an initial channel quality indicator (CQI) value for a first one of the links, wherein the initial CQI value is based on the channel sounding signal received by the non-AP MLD at a first time over the first link, and
  receive, from the non-AP MLD in a CQI offset frame, a CQI offset value for the first link and an uplink interference power level on a second one of the links at the first time, wherein the CQI offset value is relative to the initial CQI value and is based on interference caused on the first link by the second link at a second time; and
a processor operably coupled to the APs, the processor configured to determine, based on the initial CQI value, the CQI offset value, and the uplink interference power level, an updated CQI value for the first link at the second time.

8. The AP MLD of claim 7, wherein the CQI offset frame indicates whether to increase or decrease the initial CQI value by the CQI offset value to determine the updated CQI value.

9. The AP MLD of claim 7, wherein:
the CQI offset frame includes a lower CQI offset value and an upper CQI offset value, and
the processor is further configured to determine the updated CQI value by subtracting the lower CQI offset value from the initial CQI value or adding the upper CQI offset value to the initial CQI value.

10. The AP MLD of claim 9, wherein:
the first link and the second link form a link pair,
the transceivers are configured to receive, from the non-AP MLD over the first link and the second link, the CQI offset frame, and
based on the link pair being switched from a simultaneous transmit/receive (STR) mode to a non-simultaneous transmit/receive (NSTR) mode between the first time and the second time, the lower CQI offset value is set to zero and the upper CQI offset value is set to an amount that reflects additional interference in the link pair relative to the initial CQI value, or
based on the link pair being switched from the NSTR mode to the STR mode between the first time and the second time, the lower CQI offset value is set to an amount that reflects reduced interference in the link pair relative to the initial CQI value and the upper CQI offset value is set to zero.

11. The AP MLD of claim 9, wherein:
the first link and the second link form a simultaneous transmit/receive (STR) link pair,
the transceivers are configured to receive, from the non-AP MLD over the first link and the second link, the CQI offset frame, and
based on interference in the link pair at the second time being different than interference in the link pair at the first time, the lower CQI offset value is set to an amount that reflects a non-tolerable amount of interference in the link pair relative to the initial CQI value and the upper CQI offset value is set to an amount that reflects no interference in the link pair relative to the initial CQI value.

12. The AP MLD of claim 7, wherein:
the links form link pairs, and
the CQI offset frame further includes a non-simultaneous transmit/receive (NSTR) indication bitmap in which, for each link pair, two or more bits represent a value that reflects an interference level in the corresponding link pair.

13. A method of wireless communication performed by a non-access point (AP) multi-link device (MLD) that is configured to form links between stations (STAs) affiliated with the non-AP MLD and corresponding APs affiliated with an AP MLD, the method comprising:
receiving, from the AP MLD, a channel sounding signal at a first time over a first one of the links;
determining, based on the channel sounding signal, an initial channel quality indicator (CQI) value for the first link;
transmitting, to the AP MLD, the initial CQI value;
determining, based on interference caused on the first link by a second one of the links at a second time, a CQI offset value for the first link that is relative to the initial CQI value;
generating a CQI offset frame that includes the CQI offset value for the first link and an uplink interference power level on the second link at the first time, wherein an updated CQI value for the first link is obtained based on the CQI offset value and the uplink interference power level; and transmitting, to the AP MLD, the CQI offset frame including the CQI offset value.

14. The method of claim 13, wherein the CQI offset frame indicates whether to increase or decrease the initial CQI value by the CQI offset value to obtain the updated CQI value for the first link at the second time.

15. The method of claim 13, wherein:
the CQI offset frame includes the CQI offset value as a lower CQI offset value and an upper CQI offset value, and the updated CQI value for the first link at the second time is obtained by subtracting the lower CQI offset value from the initial CQI value or adding the upper CQI offset value to the initial CQI value.

16. The method of claim 15, wherein:
the first link and the second link form a link pair,
the method further comprising:
based on a determination to switch the link pair from a simultaneous transmit/receive (STR) mode to a non-simultaneous transmit/receive (NSTR) mode between the first time and the second time, setting the lower CQI offset value to zero and setting the upper CQI offset value to an amount that reflects additional interference in the link pair relative to the initial CQI value; or based on a determination to switch the link pair from the NSTR mode to the STR mode between the first time and the second time, setting the lower CQI offset value to an amount that reflects reduced interference in the link pair relative to the initial CQI value and setting the upper CQI offset value to zero; and transmitting, to the AP MLD over the first link and the second link, the CQI offset frame.

17. The method of claim 15, wherein:
the first link and the second link form a simultaneous transmit/receive (STR) link pair,
the method further comprising:
based on a determination that interference in the link pair at the second time is different than interference in the link pair at the first time, setting the lower CQI offset value to an amount that reflects a non-tolerable amount of interference in the link pair relative to the initial CQI value and setting the upper CQI offset value to an amount that reflects no interference in the link pair relative to the initial CQI value; and transmitting, to the AP MLD over the first link and the second link, the CQI offset frame.

18. The method of claim 13, wherein:
the links form link pairs, and
the CQI offset frame further includes a non-simultaneous transmit/receive (NSTR) indication bitmap in which, for each link pair, two or more bits represent a value that reflects an interference level in the corresponding link pair.

* * * * *